2 Sheets—Sheet 1.

E. R. BROWN,

Assignor by mesne assignments to E. CHESTERMAN & S. McHENRY.

TICKET-RECORDER.

No. 7,300. Reissued Sept. 5, 1876.

Witnesses.

J. E. Cheney

H. A. M. Harris.

Inventor.

Edwin R. Brown per Edwin Chesterman

Attorney.

2 Sheets—Sheet 2.

E. R. BROWN,

Assignor by mesne assignments to E. CHESTERMAN & S. McHENRY.

TICKET-RECORDER.

No. 7,300. Reissued Sept. 5, 1876.

Witnesses

J. E. Cheney

C. A. M. Harris.

Inventor

Edwin R. Brown per Edwin Chesterman

Attorney.

UNITED STATES PATENT OFFICE.

EDWIN R. BROWN, OF CHICAGO, ILLINOIS, ASSIGNOR, BY MESNE ASSIGNMENTS, TO EDWIN CHESTERMAN, OF PHILADELPHIA, PENNSYLVANIA, AND S. McHENRY, OF WOODBURY, NEW JERSEY.

IMPROVEMENT IN TICKET-RECORDERS.

Specification forming part of Letters Patent No. 34,939, dated April 15, 1862; reissue No. 7,300, dated September 5, 1876: application filed August 29, 1876.

DIVISION B.

*To all whom it may concern:*

Be it known that I, EDWIN R. BROWN, of Chicago, in the county of Cook and State of Illinois, have invented an Improved Ticket-Recorder for railroads, hotels, and other uses, of which the following is a specification. Another Division, "A," is filed simultaneously herewith.

Figure 2:
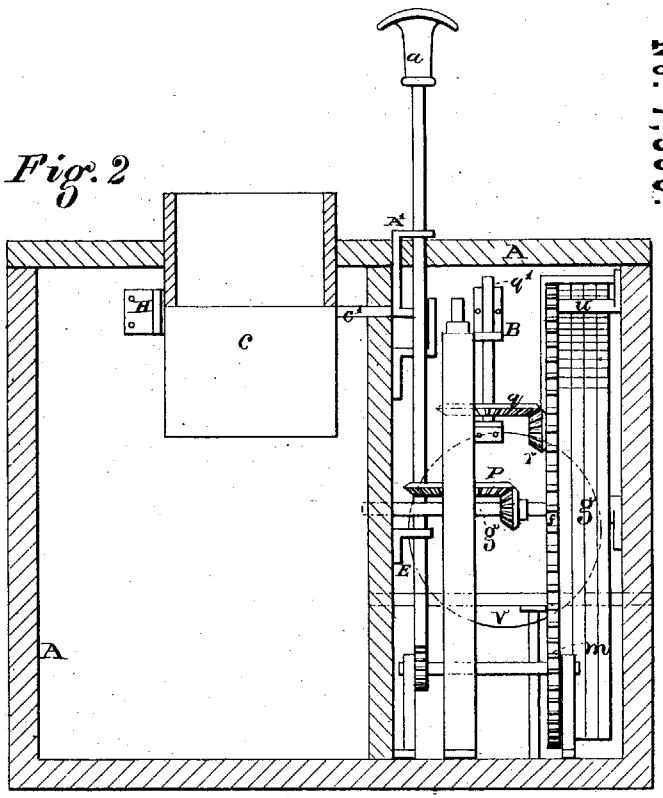
Figure 1:
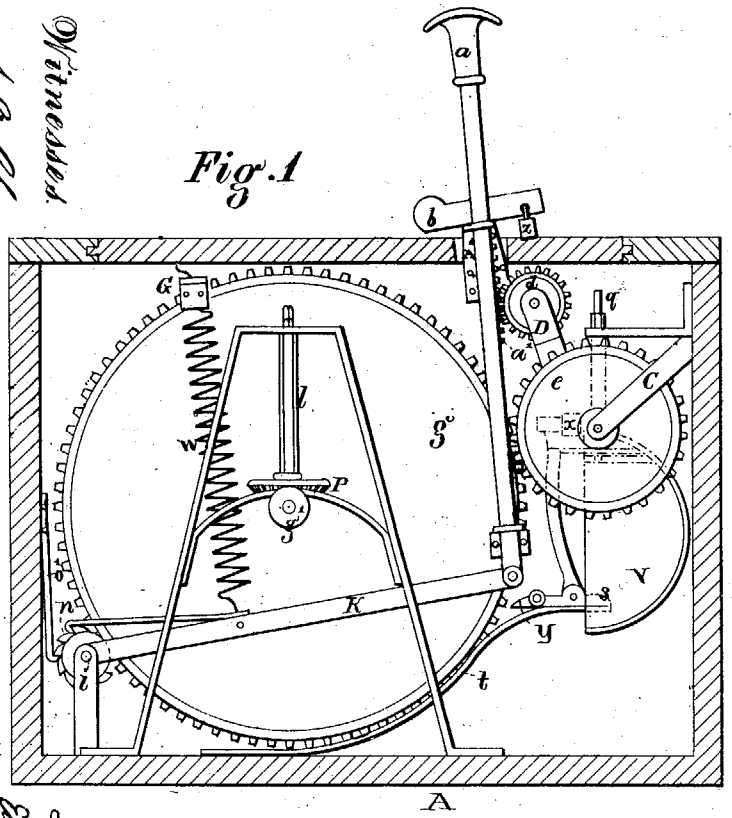
Figure 3:
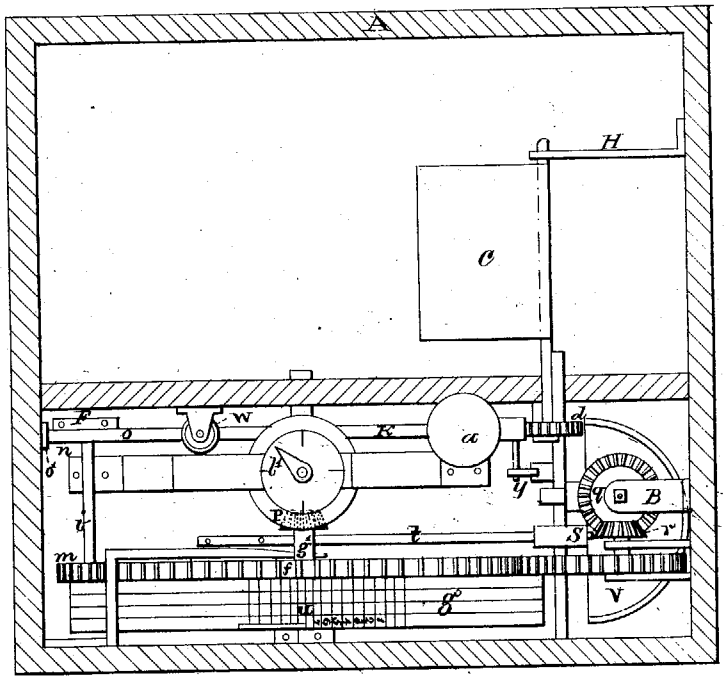

In the drawing, Figure 1 is a transverse section of a machine illustrating my invention. Fig. 2 is a longitudinal section of the same in a slightly modified form. Fig. 3 is a plan of the same with the top or cover removed.

Similar letters of reference indicate corresponding parts of the several figures.

The subject of my invention is a portable apparatus, by means of which an accurate record is kept of the number of travelers passing over a road, and fraud against the same thereby prevented.

The invention consists in the combination, in a portable apparatus carried and operated by the collector of fares, with an actuating-arm, feeding pawl and ratchet moved around a common center, of a retaining-pawl attached to the body of the machine, and all placed at the point most distant from the point of actuation; also, in the combination of the registering and alarm mechanisms with the actuating-handle by means of spring pawls or ratchets; also, in combination with the actuating-arm of a registering apparatus of a key whereby it may be held stationary when not in use, and registration effectually prevented.

Its construction and operation are as follows: A represents the outer case of the machine, which may be of any material preferred, and of such size as the particular use for which the machine is designed may render necessary. A′, B, C, D, E, F, G, and H are lugs by which the moving parts are secured. *a* is the actuating-rod, operating, by one and the same impact, the deposit in the receiver, the register, and the indicator or alarm. It reciprocates in the lugs A′ and E, and is provided with a rack, *a′*, which gears with a pinion, *d*, on a shaft, *c′*, journaled in lugs D and H. An apron, *c*, is attached to the shaft *c′*, and opens and closes the depositing-orifice of the receiver.

A bar, *k*, pivoted at one end to the rod *a* is at the other end loosely fulcrumed upon a shaft, *i*, which is journaled in bearings F F. A pinion, *m*, and ratchet-wheel *n* are secured to the shaft *i* near its respective ends. The spring feeding-pawl *o′*, attached to the bar *k*, engages with the teeth of the ratchet-wheel *n*, so as to impart a slight rotation to said ratchet-wheel at each motion of the bar *k* when actuated by rod *a*. The retaining spring-pawl *o* also engages with the teeth of the ratchet-wheel *n* and prevents retrograde motion of said wheel *n*. The reaction-spring *w*, attached to the bar *k*, restores the bar *k*, rod *a*, and apron *c*, to position after deposit, registration, and indication have been effected. The pinion *m* gears with a cogged rim, *f*, upon a large drum, *g*, which is secured to a shaft journaled in the main frame or casing.

By means of suitable gearing P the motion of shaft *g* is communicated to a shaft, *l*, which carries an index, *l′*. In the present illustration the gearing P is so proportioned as to impart but one revolution to the index *l′* by every four revolutions of the drum *g*. The drum *g* has a series of continuous numbers which envelop the drum in four lines, so that the position of the index *l* indicates the line on the drum to be read from.

It will be observed that great compactness is achieved by placing the registering-train between the point of actuation and the point at which the feeding-pawl engages with the ratchet of the registering-train. A key-shaft, *q′*, communicates through gearing *q r e f* with the drum *g*, for the purpose of rotating it without the agency of the hand-rod *a*, and without sounding the alarm, setting it to any desired number as a starter. A stationary pointer, *u*, assists in reading the figures on drum *g*. The hammer X is shaped and pivoted like a bellcrank lever, and provided with a spring-pawl, *y*, which engages with the actuating-rod *a* in one direction, but passes it freely in the other. A reaction-spring, *t*, upon the release of the hammer from rod *a*, throws it against the bell *v*. This release, it will be observed, cannot take place until the register has been actuated. A key, *b*, passes through the rod *a*, when desired, and, secured by the lock *z*, effectually prevents the movement of the mechanism by improper and unauthorized persons. It will also be observed that the receiver is a primary and not a secondary receiver. The ticket or check is examined, and errors, if any, corrected while the passenger retains control of his property, and the deposit only takes place at the conclusion of the settlement, and is single and not double, as in case of fare-boxes.

Before placing the machine in the hands of the conductor or fare-taker the superintendent or other person in charge, by means of key-shaft *q'*, sets the drum *g* at any desired position, noting the indications of the pointer *u* and index *l* of the registering-trains and closes the case, leaving only the actuating-rod *a* exposed.

The conductor or fare-taker carries the machine with him through the car, and as each ticket or check is placed upon the apron he actuates rod *a*, and thereby opens the mouth of the receiver and deposits the ticket or check, rotates the ratchet-wheel *n* one tooth, and the drum *g* the space of one number, and last of all releases the hammer, which strikes an alarm, and thus indicates that a registration has been effected.

In Fig. 1 the rod *a* and bar *k*, &c., are represented on the opposite side of the drum from that which they occupy in the other views. This and other slight modifications may be made in the apparatus without departing from the essential principles of the invention.

I claim and desire to secure by Letters Patent—

1. In a portable fare-register, having alarm mechanism, the registering-train placed between the point of actuation and the point at which the feeding-pawl engages with the ratchet-wheel of the register, substantially as and for the purpose described.

2. In a fare-register, the combination of a register and alarm with a handle, by means of a ratchet-wheel or driving-pawl, *o'*, retaining-pawl *o*, and the alarm-pawl *y*, substantially as described.

3. In a fare-register having alarm mechanism, the combination, with the actuating-handle, of devices, whereby the actuation of the instrument is prevented at the will of the conductor, substantially as and for the purpose described.

EDWIN R. BROWN.

Witnesses:
H. A. CHASE,
ANDREW RICKER.